United States Patent
Kayama et al.

(10) Patent No.: US 7,053,514 B2
(45) Date of Patent: May 30, 2006

(54) IMAGE APPARATUS AND DRIVE MOTOR

(75) Inventors: Shun Kayama, Saitama (JP); Yukiko Shimizu, Saitama (JP); Atsushi Takano, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/044,263

(22) Filed: Jan. 28, 2005

(65) Prior Publication Data
US 2005/0174009 A1 Aug. 11, 2005

(30) Foreign Application Priority Data
Feb. 3, 2004 (JP) ............................ P2004-026626

(51) Int. Cl.
*H02K 37/14* (2006.01)
*H02K 1/12* (2006.01)
*H02K 33/16* (2006.01)
*G03B 9/10* (2006.01)

(52) U.S. Cl. ..................... 310/156.26; 310/40 MM; 310/49 R; 310/216; 310/254; 396/449; 396/463; 396/471; 396/508; 359/696

(58) Field of Classification Search ......... 310/40 MM, 310/49 R, 156.26, 162, 216, 254; 396/449, 396/463, 471, 508; 359/696, 697, 698
See application file for complete search history.

(56) References Cited

U.S. PATENT DOCUMENTS

| | | | | |
|---|---|---|---|---|
| 5,262,812 A | * | 11/1993 | Fukasawa | 396/455 |
| 5,264,896 A | * | 11/1993 | Lee et al. | 396/235 |
| 5,705,873 A | * | 1/1998 | Sato | 310/193 |
| 5,764,292 A | * | 6/1998 | Yamaguchi | 348/363 |
| 6,027,261 A | * | 2/2000 | Naganuma | 396/508 |
| 6,086,267 A | * | 7/2000 | Tsuzuki et al. | 396/459 |
| 6,350,068 B1 | * | 2/2002 | Tsuzuki et al. | 396/450 |
| 6,370,336 B1 | * | 4/2002 | Nishinou et al. | 396/277 |
| 6,443,635 B1 | * | 9/2002 | Matsumoto et al. | 396/463 |
| 6,467,975 B1 | * | 10/2002 | Tsuzuki et al. | 396/449 |
| 6,547,457 B1 | * | 4/2003 | Yaginuma et al. | 396/460 |
| 6,724,428 B1 | * | 4/2004 | Goh | 348/373 |
| 6,749,348 B1 | * | 6/2004 | Seita | 396/443 |
| 6,903,777 B1 | * | 6/2005 | Arisaka | 348/362 |
| 2002/0037169 A1 | * | 3/2002 | Yaginuma et al. | 396/458 |

FOREIGN PATENT DOCUMENTS

JP 2001-083569 3/2001

* cited by examiner

*Primary Examiner*—Tran Nguyen
*Assistant Examiner*—David W. Scheuermann
(74) *Attorney, Agent, or Firm*—Rader, Fishman & Grauer PLLC; Ronald P. Kananen

(57) ABSTRACT

A drive motor is proposed, which serves as a drive source for a movement mechanism constituting an iris for an optical path of an imaging system. The drive motor has a shaft serving as a center of rotation, a magnet, two-pole magnetized and rotated around the shaft, a turning arm engaged with movable members and turned integrally with the magnet, for moving the movable members in a direction associated with a turning direction, a stator coil wound in a direction perpendicular to a direction of rotation of the magnet and disposed in such a way to enclose the magnet from outside, a coil bobbin on which the stator coil is wound, a stator yoke disposed outside the coil bobbin and having a cylindrical circumferential surface part penetrated in an axial direction of the shaft, and position detection means for detecting a rotational position of the magnet.

10 Claims, 14 Drawing Sheets

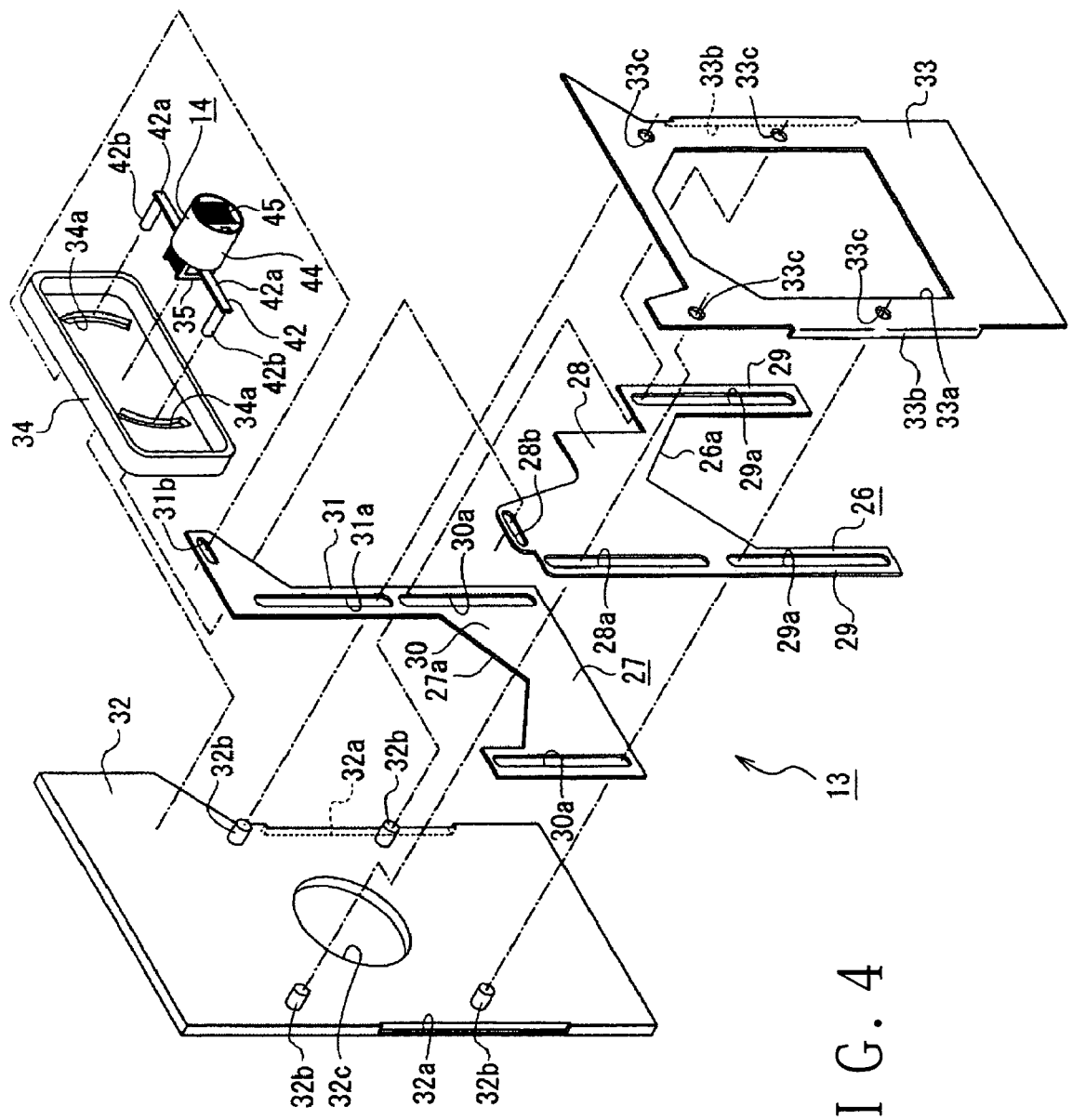
F I G. 4

F I G. 1 7
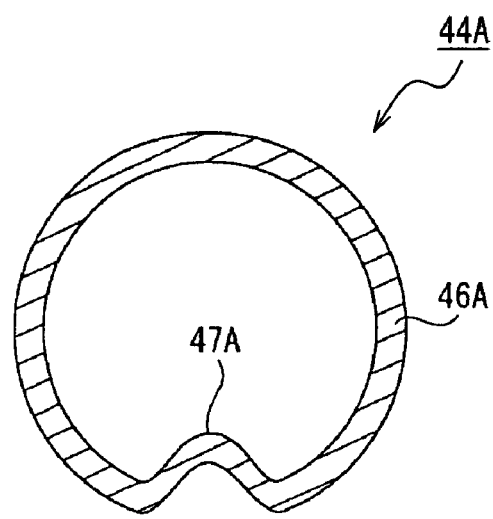
F I G. 1 8
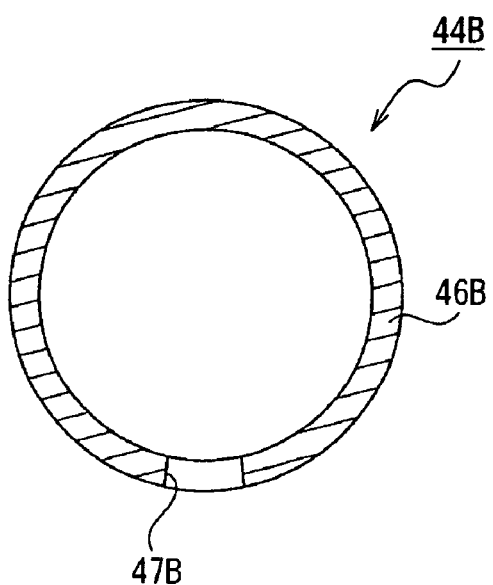
F I G. 1 9
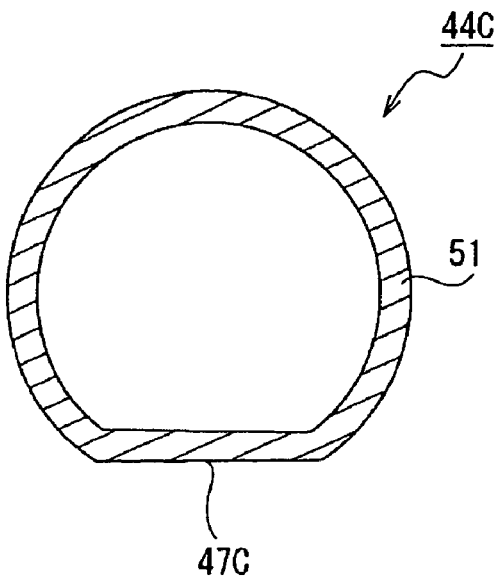

IMAGE APPARATUS AND DRIVE MOTOR

CROSS REFERENCE TO RELATED APPLICATION

This application claims priority from Japanese Priority Application No. 2004-026626, filed on Feb. 3, 2004 with the Japanese Patent Office, the entire content of which is hereby incorporated by reference.

BACKGROUND OF THE INVENTION

1. Field of the Invention

The present invention relates to a technical field of an imaging apparatus and a drive motor. More particularly, the invention relates to a technical field of reducing the number of components of the apparatus and achieving miniaturization thereof by simultaneously maintaining sufficient torque generated by a drive motor for moving movable members that constitute an iris or a shutter.

2. Description of Related Art

Some imaging apparatuses, such as a video camera and a still camera, are adapted to have a lens moving mechanism, which moves various kinds of lenses for focus control and for zooming in the direction of an optical axis, and also have an iris for adjusting an amount of light, and also adapted to move movable members (or diaphragm blades) constituting an iris in a plane perpendicular to an optical axis of an imaging optical system by utilizing a driving force of a drive motor thereby to open and close an optical path of an optical system and to adjust an amount of light (see, for example, the specification of Japanese Patent No. 3,295,415).

In this imaging apparatus, for instance, a turning arm for transmitting the driving force of the drive motor to the movable members is provided. A part of the turning arm is fixed to a shaft (or motor shaft) of the drive motor. An engaging section provided at an end part of the turning arm is slidably engaged with an engaging elongated hole formed in the movable member. A turning force of the turning arm is converted into a translational movement force for translational movement of the movable members to thereby move the movable members.

The drive motor described in the specification of Japanese Patent No. 3,295,415 is configured so that a magnet is disposed in a stator yoke. An output pin (that is, a member corresponding to the turning arm) provided in the magnet is outwardly protruded from a cutout formed in the stator yoke. Two pins formed of ferromagnetic materials in such a way as to be spaced from each other in the direction of rotation of the magnet are provided in the stator yoke. The output pin, which is turned as the magnet rotates, is held at each of movement ends in the direction of rotation thereof by being attached thereto by one of the two pins.

SUMMARY OF THE INVENTION

However, the conventional imaging apparatus described in the specification of Japanese Patent No. 3,295,415 uses the two pins, which are made of ferromagnetic materials, so as to make the output pin, which corresponds to the turning arm, held at each of the movement ends in the direction of turn thereof. Thus, the conventional apparatus has the following drawbacks. That is, the number of components is large for that. Further, a large space for disposing the two pins is needed. The miniaturization thereof is hindered.

Meanwhile, during an operation of rotating the magnet in the drive motor, a ripple-like voltage change may occur. In a case where torque of the drive motor is small when such change in the voltage occurs, smooth movement of the movable members is hindered. At worst, the movement of the movable members may be stopped.

Accordingly, problems to be solved by the invention are to overcome the drawbacks and to achieve reduction in the number of components thereof and miniaturization thereof by simultaneously maintaining sufficient torque generated by the drive motor.

To solve the problems, according to the invention, there are provided an imaging apparatus and a drive motor, each of which comprises a shaft serving as a center of rotation, a magnet, two-pole-magnetized and rotated around the shaft, a turning arm engaged with movable members and turned integrally with the magnet, for moving the movable members in a direction associated with a turning direction, a stator coil wound in a direction perpendicular to a direction of rotation of the magnet and disposed in such a way to enclose the magnet from outside, a coil bobbin on which the stator coil is wound, a stator yoke disposed outside the coil bobbin and having a cylindrical circumferential surface part penetrated in an axial direction of the shaft, and position detection means for detecting a rotational position of the magnet. A closed magnetic path, which is closed in a direction of rotation of the magnet, is constituted by the circumferential surface part of the stator yoke. A magnetic balance holding section, which holds a magnetically balanced condition between the magnet and the stator yoke during non-energization of the stator coil, is formed integrally with the stator yoke.

Thus, in the imaging apparatus and the motor according to the invention, the magnetic balance holding section formed integrally with the stator yoke holds the magnetically balanced condition between the magnet and the stator yoke during the non-energization of the stator coil.

The imaging apparatus according to the invention has a lens barrel, in which an imaging optical system is disposed, and a movement mechanism having movable members, which constitutes an iris or a shutter and opens and closes an optical path of an imaging optical system, and also has a drive motor serving as a drive source for the movement mechanism. The imaging apparatus features that the drive motor comprises a shaft serving as a center of rotation, a magnet, two-pole magnetized and rotated around the shaft, a turning arm engaged with movable members and turned integrally with the magnet, for moving the movable members in a direction associated with a turning direction, a stator coil wound in a direction perpendicular to a direction of rotation of the magnet and disposed in such a way to enclose the magnet from outside, a coil bobbin on which the stator coil is wound, a stator yoke disposed outside the coil bobbin and having a cylindrical circumferential surface part penetrated in an axial direction of the shaft, and position detection means for detecting a rotational position of the magnet. The imaging apparatus also features that a closed magnetic path, which is closed in a direction of rotation of the magnet, is constituted by the circumferential surface part of the stator yoke, and that a magnetic balance holding section, which holds a magnetically balanced condition between the magnet and the stator yoke during non-energization of the stator coil, is formed integrally with the stator yoke.

Thus, as compared with a case of providing in the motor a separate member exclusively used as the magnetic balance holding section, the number of components thereof can be reduced. Furthermore, because of the small arrangement space of the magnetic balance holding section, the miniaturization thereof can be achieved.

Further, because the closed magnetic path, which is closed in the direction of rotation of the magnet, is constituted by the circumferential surface part of the stator yoke, leakage of magnetic flux is little. The torque of the drive motor is enhanced to thereby improve the reliability of operations thereof.

Moreover, the consumption of electric power can be reduced by enhancing the torque of the drive motor.

According to one embodiment of the present invention, a projecting part protruded from the circumferential surface part of the stator yoke is used as the magnetic balance holding section. Thus, the configuration thereof is simple. The configuration of the drive motor can be simplified. Also, the torque of the drive motor can be enhanced without a steep rise in the cost thereof.

According to one embodiment of the present invention, the projecting part is protruded toward the coil bobbin from the inner surface of the circumferential surface part. Thus, the miniaturization of the drive motor can be enhanced for that.

According to one embodiment of the present invention, the projecting part is protruded toward a side opposite to the coil bobbin from an outer surface of the circumferential surface part. Thus, the effective utilization of an inner space of the circumferential surface part can be achieved.

According to one embodiment of the present invention, a hole or a cutout is formed in the circumferential surface part as the magnetic balance holding section of the stator yoke. Thus the stator yoke does not need to be provided with a projecting part serving as the magnetic balance holding section. Consequently, the stator yoke can easily be formed. Also, the miniaturization of the drive motor and the effective utilization of the inner space of the circumferential surface part can be achieved.

According to one embodiment of the present invention, the circumferential surface part of the stator yoke comprises an arcuate surface part and a planar part positioned between both ends in the circumferential direction of the arcuate surface part. The planar part is formed as the magnetic balance holding section. Thus, as compared with a case of forming the entire yoke like a cylinder, the miniaturization of the drive motor can be achieved.

The drive motor according to the invention serves as a drive source for a movement mechanism having movable members, which constitutes an iris or a shutter and opens and closes an optical path of an imaging optical system disposed in a lens barrel. The drive motor features that the drive motor comprises a shaft serving as a center of rotation, a magnet, two-pole magnetized and rotated around the shaft, a turning arm engaged with movable members and turned integrally with the magnet, for moving the movable members in a direction associated with a turning direction, a stator coil wound in a direction perpendicular to a direction of rotation of the magnet and disposed in such a way to enclose the magnet from outside, a coil bobbin on which the stator coil is wound, a stator yoke disposed outside the coil bobbin and having a cylindrical circumferential surface part penetrated in an axial direction of the shaft, and position detection means for detecting a rotational position of the magnet. The drive motor also features that a closed magnetic path, which is closed in a direction of rotation of the magnet, is constituted by the circumferential surface part of the stator yoke, and that a magnetic balance holding section, which holds a magnetically balanced condition between the magnet and the stator yoke during non-energization of the stator coil, is formed integrally with the stator yoke.

Thus, as compared with a case of providing in the motor a separate member exclusively used as the magnetic balance holding section, the number of components thereof can be reduced. Furthermore, because of the small arrangement space of the magnetic balance holding section, the miniaturization thereof can be achieved.

Further, because the closed magnetic path, which is closed in the direction of rotation of the magnet, is constituted by the circumferential surface part of the stator yoke, leakage of magnetic flux is little. The torque of the drive motor is enhanced to thereby improve the reliability of operations thereof.

Moreover, the consumption of electric power can be reduced by enhancing the torque of the drive motor.

According to one embodiment of the present invention, a projecting part protruded from the circumferential surface part of the stator yoke is used as the magnetic balance holding section. Thus, the configuration thereof is simple. The configuration of the drive motor can be simplified. Also, the torque of the drive motor can be enhanced without a steep rise in the cost thereof.

According to one embodiment of the present invention, the projecting part is protruded toward the coil bobbin from the inner surface of the circumferential surface part. Thus, the miniaturization of the drive motor can be enhanced for that.

According to one embodiment of the present invention, the projecting part is protruded toward a side opposite to the coil bobbin from an outer surface of the circumferential surface part. Thus, the effective utilization of an inner space of the circumferential surface part can be achieved.

According to one embodiment of the present invention, a hole or a cutout is formed in the circumferential surface part is formed as the magnetic balance holding section of the stator yoke. Thus the stator yoke does not need to be provided with a projecting part serving as the magnetic balance holding section. Consequently, the stator yoke can easily be formed. Also, the miniaturization of the drive motor and the effective utilization of the inner space of the circumferential surface part can be achieved.

According to one embodiment of the present invention, the circumferential surface part of the stator yoke comprises an arcuate surface part and a planar part positioned between both ends in the circumferential direction of the arcuate surface part. The planar part is formed as the magnetic balance holding section. Thus, as compared with a case of forming the entire yoke like a cylinder, the miniaturization of the drive motor can be achieved.

Further features of the invention, and the advantages offered thereby, are explained in detail hereinafter, in reference to specific embodiments of the invention illustrated in the accompanying drawings.

BRIEF DESCRIPTION OF THE DRAWINGS

FIG. 4 is an exploded perspective view illustrating a movement mechanism and the drive motor.

FIG. 17 illustrates, together with FIGS. 18 to 22, an example of modification of the stator yoke and is an enlarged cross-sectional view illustrating a first example of modification of the stator yoke.

FIG. 18 is an enlarged cross-sectional view illustrating a second example of modification of the stator yoke.

FIG. 19 is an enlarged cross-sectional view illustrating a third example of modification of the stator yoke.

DESCRIPTION OF THE PREFERRED EMBODIMENTS

Hereinafter, best modes for implementing an imaging apparatus and a drive motor according to the invention are described with reference to the accompanying drawings. The best modes described hereinbelow are obtained by applying an imaging apparatus of the invention to a video camera and by applying a drive motor of the invention to a drive motor for use in the video camera. Incidentally, the scope of application of the invention is not limited to the video camera or the drive motor for use therein. The invention can be applied to various kinds of imaging apparatuses, which have the functions of taking moving images and still images, or to drive motors for use therein, in addition to a still camera.

Figure 1:
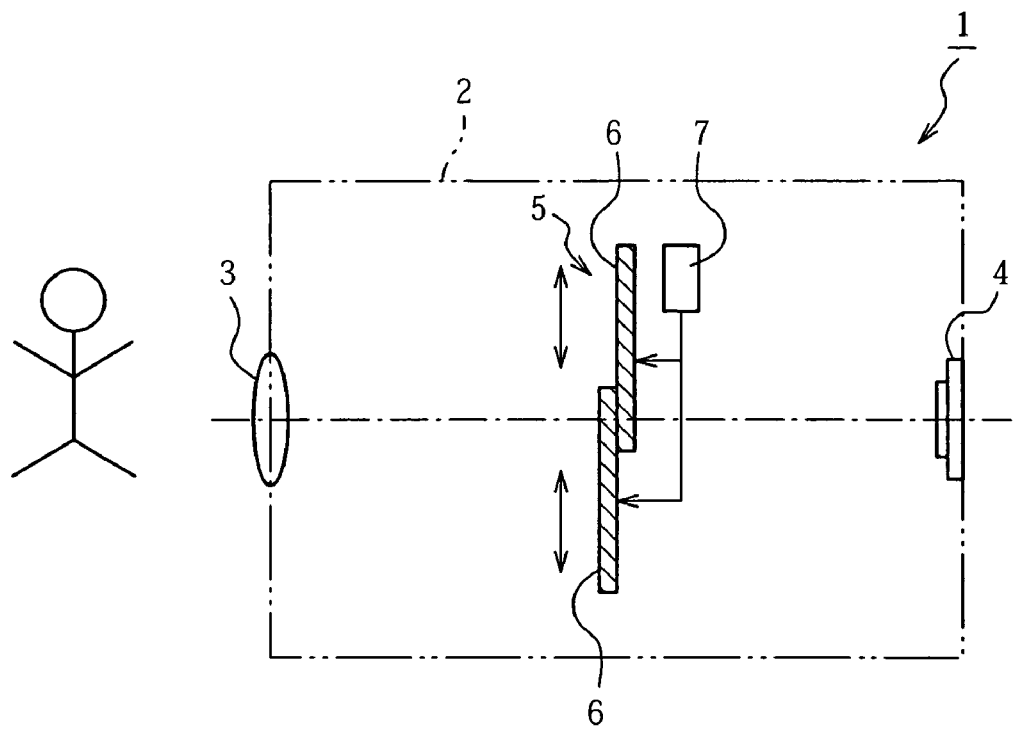
FIG. 1 shows a best mode of an imaging apparatus and a drive motor according to the invention together with FIGS. 2 to 22 and is a conceptual view illustrating the fundamental configuration of the imaging apparatus.

First, the fundamental configuration of the imaging apparatus (or video camera) is described hereinbelow (see FIG. 1).

The imaging apparatus 1 is configured so that necessary sections are disposed in a lens barrel 2 provided as an outer casing. The lens barrel 2 is provided with a lens or a lens group 3 (shown in the figure as a single lens by being simplified), an imaging means 4, such as a solid-state imaging device, and an iris or a shutter or a movement mechanism 5 having both functions thereof.

Paired movable members 6, 6 constituting the movement mechanism 5 are moved by a driving force of a drive motor 7. An optical path of an optical system is opened and closed by moving the movable members 6, 6. A motor of what is called the inner rotor type, in which a rotor is disposed in the inside of a stator, is used as the drive motor 7. The driving force of the drive motor 7 is transmitted to the movable members 6, 6, so that the movable members 6, 6 are moved.

Light coming from an object and passing through the lens or the lens group 3 is incident upon the imaging means 4 through an aperture formed by diaphragm blades and a shutter member, which are provided as the paired movable members 6, 6. Incidentally, when an amount of light is adjusted, the movable members 6, 6 are translation-moved in a plane perpendicular to an optical axis OL. In the case of application of the invention, various modes using one or plural movable members can be carried out, regardless of the number and the shapes of the movable members.

In view of taking securement of sufficiently generated torque and achievement of a high shutter speed into consideration, preferably, a motor of the voice coil type is used as the drive motor 7. Additionally, a linear motor can be employed, as needed.

Next, an example of the concrete configuration of the imaging apparatus is described hereinbelow (see FIGS. 2 to 16).

Figure 2:
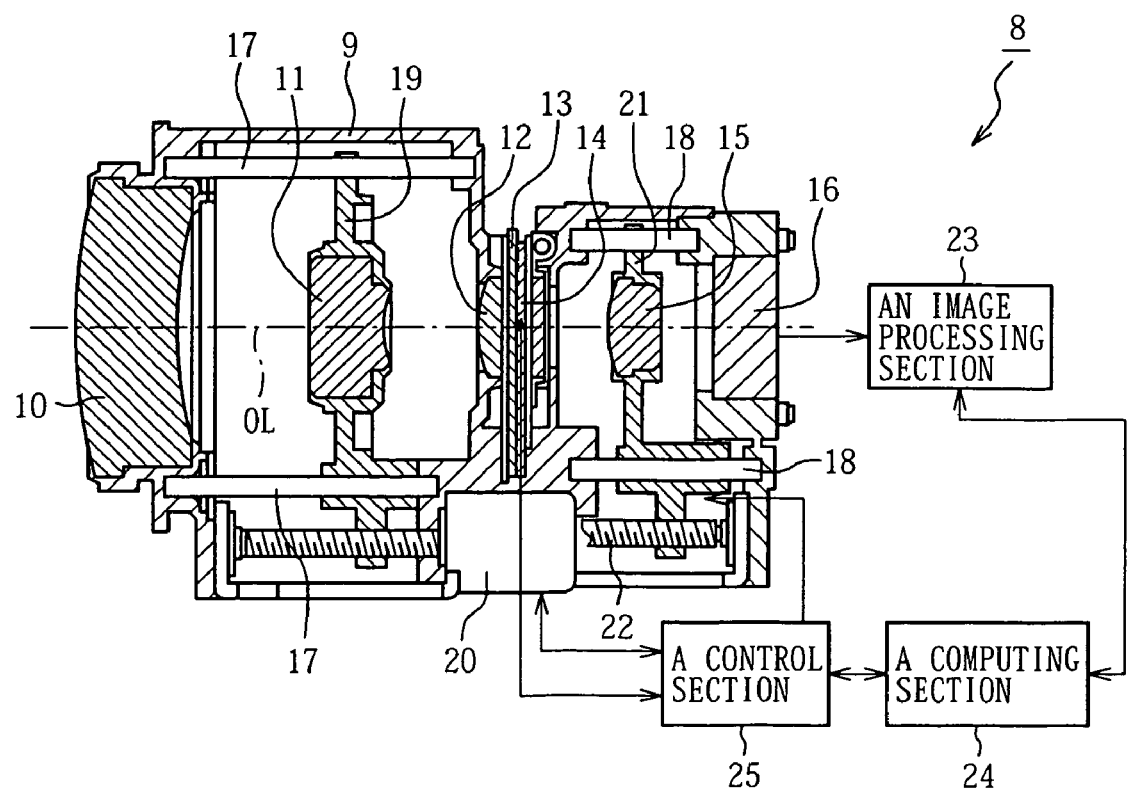
FIG. 2 is a cross-sectional view illustrating an example of the configuration of the imaging apparatus.

In the lens barrel 9 of the imaging apparatus 8, as shown in FIG. 2, an objective lens 10, a variable power lens 11, a lens 12, a movement mechanism 13, a drive motor 14, a focusing lens 15, and a solid-state imaging device 16 are disposed in such a way as to be disposed in this order from the object. The movement mechanism 13 has an iris or a shutter or functions of both the iris and the shutter. The following description describes a case where the movement mechanism 13 has the functions of both the iris and the shutter.

In the lens barrel 9, guide bars 17, 17 and 18, 18, which are parallel to the optical axis OL, are disposed across the movement mechanism 13 in the opposite positions in such a way as to extend in the direction of the optical axis OL.

The variable power lens 11 is held in a holder 19, which is slidably supported on the guide bars 17,17. The variable power lens 11 held in the holder 19 is moved in a direction along the optical axis OL by transmitting the driving force of a variable power lens drive section 20.

The focusing lens 15 is held in a holder 21, which is slidably supported on the guide bars 18, 18. The focusing lens 15 is moved in a direction along the optical axis OL by transmitting the driving force of a focusing lens drive section 22.

An image output obtained by the solid-state imaging device 16 is sent to an image processing section 23, which performs predetermined processing thereon. The image processing section 23 sends information, which is necessary for control and so on, to a computing section 24 and also sends a taken image to a viewfinder, a monitor, and so forth, and causes the viewfinder, the monitor, and so forth to display the image. Alternatively, according to operation commands sent from a user, the image processing section 23 causes recording media to record image information. The computing section 24 including a microcomputer and so on sends control command signals to a control section 25, which supplies control signals to the drive motor 14, the variable power lens drive section 20, the focusing lens drive section 22, and so on to thereby control the sections.

Figure 3:
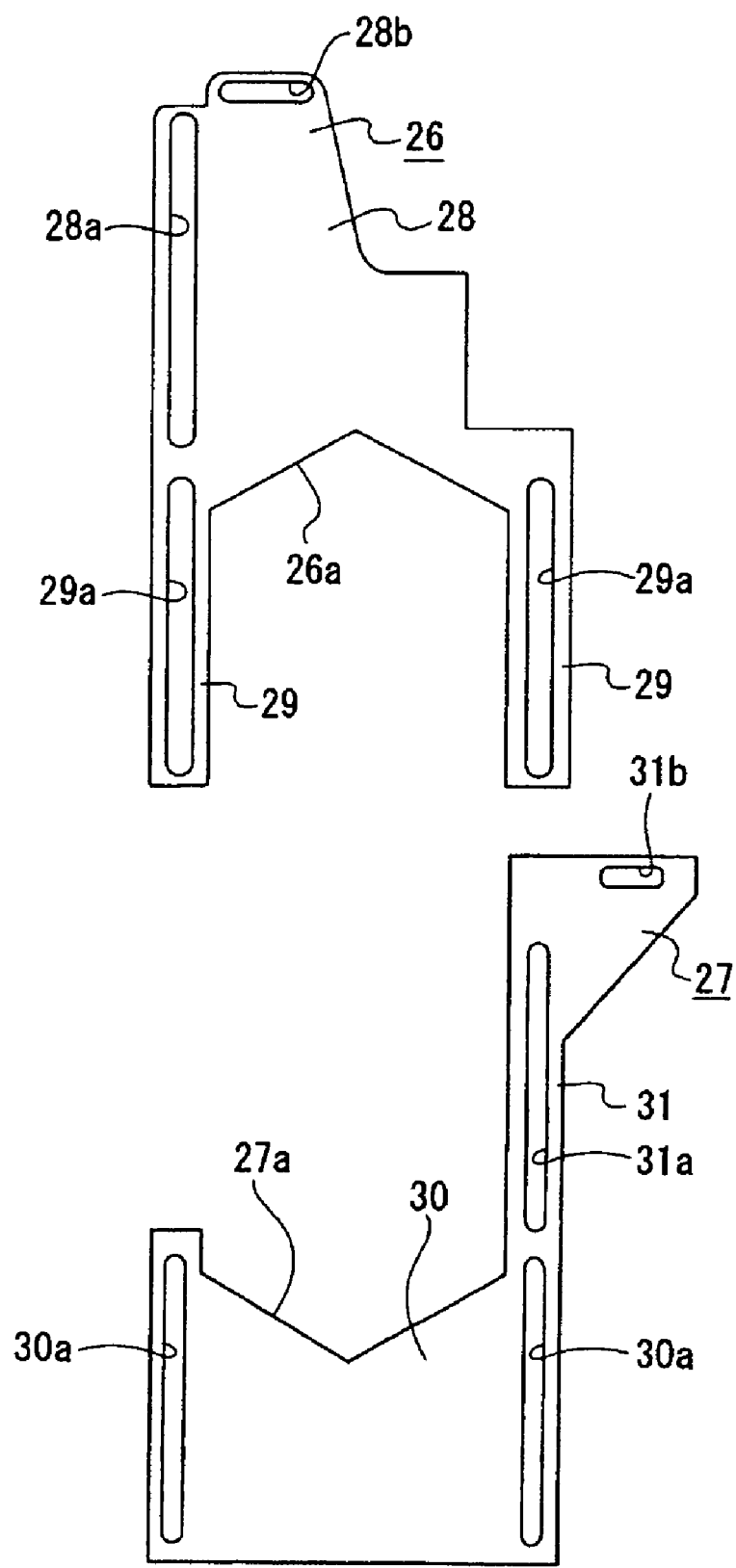
FIG. 3 is an enlarged rear view illustrating a movable member.

As shown in FIG. 3, the movement mechanism 13 has a pair of diaphragm blades functioning as movable members 26 and 27, and performs an incident light amount adjusting function and a shutter function by moving the movable members 26, 27. The movement mechanism 13 is incorporated into the lens barrel 9 without being projected from the outer peripheral surface of the lens barrel 9. Thus, the apparatus is not troubled by a problem of interference between the movement mechanism and another component. Thus, this embodiment is suitable for miniaturizing and downsizing the apparatus.

The movable member 26 is constituted by integrally forming a main section 28 and projection sections 29, 29, which project downwardly from left and right end sections thereof. An aperture cutout 26a downwardly opened is formed in the movable member 26.

In the main section 28, a guided hole 28a, which is upwardly and downwardly elongated, is formed in one of side edges thereof. An engaging hole 28b laterally elongated is formed in the top section thereof.

Guided holes 29a, 29a elongated upwardly and downwardly are formed in the projection sections 29, 29, respectively.

The movable member 27 is configured so that a main section 30 is formed integrally with a projecting part 31 upwardly projected from one of the side edge sections of the main section 30. Guided holes 30a, 30a rightwardly and leftwardly elongated, respectively, are formed in the main section 30.

A guided hole 31a upwardly and downwardly elongated is formed in the projecting part 31. An engaging hole 31b elongated laterally is formed in the top part of the projecting part 31.

Figure 5:
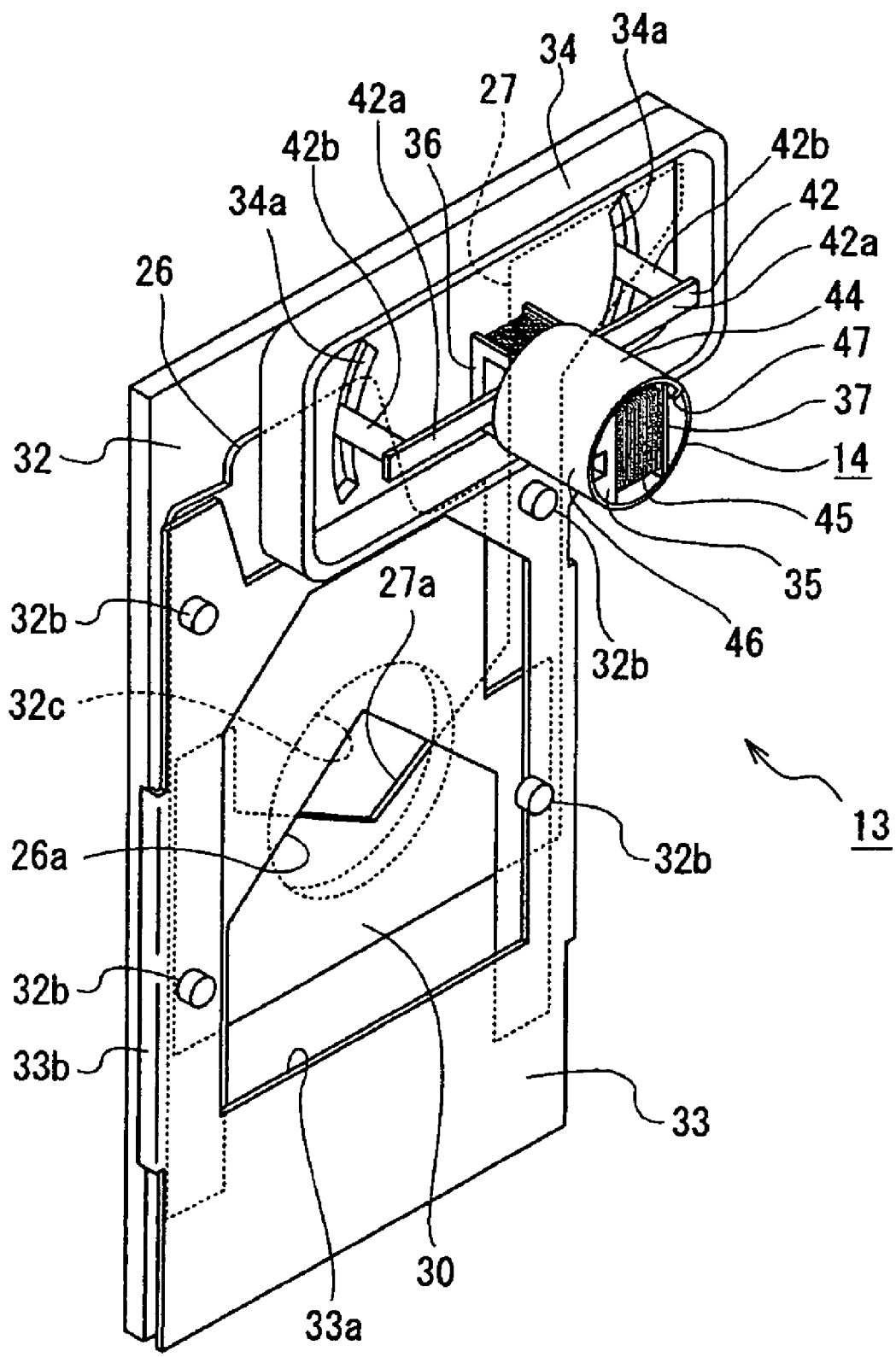
FIG. 5 is an enlarged perspective view illustrating the movement mechanism and the drive motor.

The movable members 26 and 27 are supported by a base element 32 in such a way as to be able to move upwardly and downwardly (see FIGS. 4 and 5).

The base element 32 is formed in such a manner as to be longitudinally elongated, and has mounting grooves 32a, 32a provided in both left and right side edges, respectively. The base element 32 is provided with four guide pins 32b, 32b, . . . in the left, the right, the top and the bottom parts thereof in such a way as to be separated from one another. A penetration hole 32c is formed in a substantially central part of the base element 32. The optical axis OL of the optical system is set in a position in such a way as to pass through the center of the penetration hole 32c.

Three of the guide pins 32b, 32b, 32b provided on the base element 32 are respectively inserted into the guided holes 28a, 29a, 29a of the movable member 26 in such a way as to be slidably engaged therewith. That is, the two guide pins 32b, 32b are respectively engaged with the guided holes 29a, 29a of the movable member 26 and with the guided holes 30a, 30a of the movable member 27. Another one of the other guide pins 32b is engaged only with the guided hole 28a of the movable member 26. Also, the other guide pin 32b is engaged only with the guided hole 31a of the movable member 27.

A cover element 33 is attached to the base element 32 in a state in which the movable members 26 and 27 are supported by the base element 32. The cover element 33 is formed in an elongated shape. A large opening 33a is formed in the central part of the cover element 33. Mounted projecting parts 33b, 33b are provided on left and right side edges of the cover element 33, respectively. Four mounting holes 33c, 33c, . . . are formed in the cover element 33.

The mounted projecting parts 33b, 33b are inserted into the mounting grooves 32a, 32a, respectively. Moreover, the guide pins 32b, 32b, . . . are inserted into the mounting holes 33c, 33c, . . . , respectively. Thus, the cover element 33 is attached to the base element 32 in such a way as to cover the movable members 26 and 27 (see FIG. 5). The opening 33a of the cover element 33 is formed in such a way as to be larger than the penetration hole 32c of the base element 32. In a state in which the cover element 33 is attached to the base element 32, the penetration hole 32c is positioned in the opening 33a.

A motor mounting member 34 is mounted at the top part of the base element 32 (see FIGS. 4 and 5). Insertion holes 34a, 34a are formed in the motor mounting member 34 in such a way as to be laterally separated from each other. The insertion holes 34a, 34a are respectively formed like outwardly convex arcs.

The drive motor 14 is of the inner rotor type and also of the movable magnet type, in which a magnet is provided in a rotor and which a coil is provided in a stator (see FIGS. 6 to 9).

Figure 7:
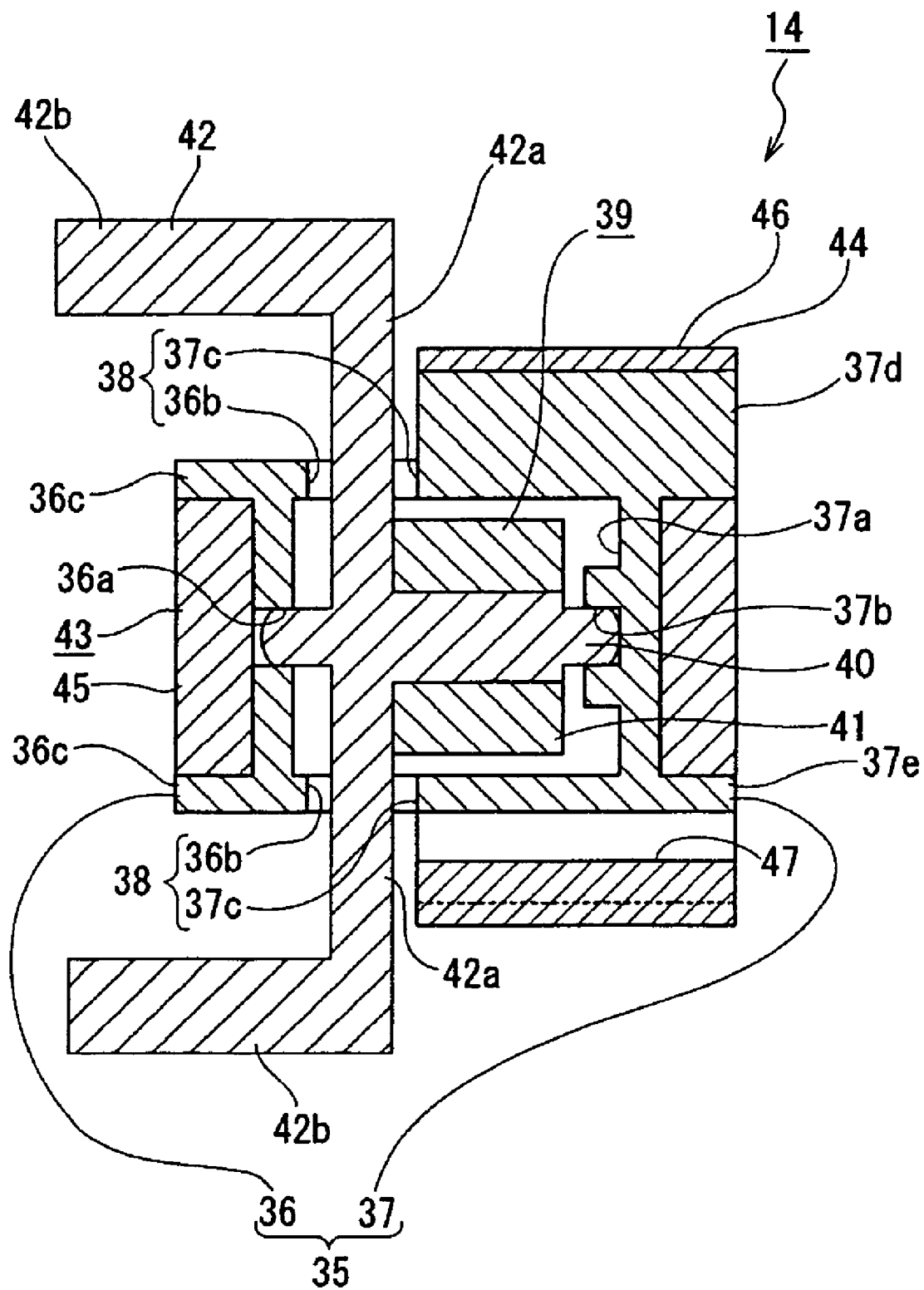
FIG. 7 is an enlarged cross-sectional view illustrating the drive motor.
Figure 8:
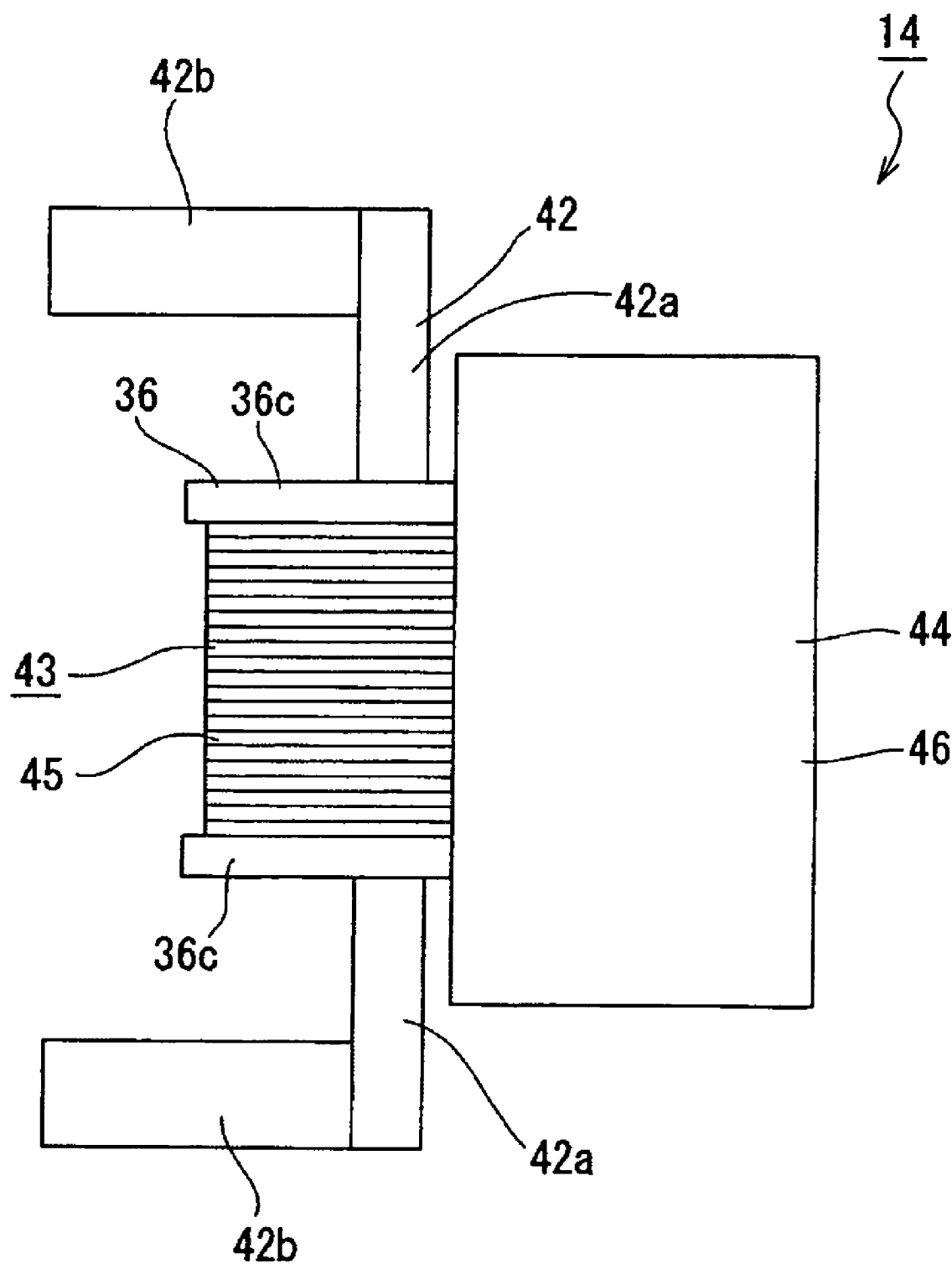
FIG. 8 is an enlarged plan view illustrating the drive motor.

The drive motor 14 has a coil bobbin 35, which is constituted by connecting a first member 36 to a second member 37 (see FIG. 7).

A bearing hole 36a is formed in a central part of the first member 36. The bearing hole 36a functions as a radial bearing of a shaft (to be described later). Arrangement grooves 36b, 36b extending radial directions are formed in the first member 36. The arrangement grooves 36b, 36b are positioned across the central part of the first member 36 in such a way as to be in opposite sides being 180° apart from each other. Winding ridges 36c, 36c placed in parallel with each other are provided on a surface opposite to a surface in which the arrangement grooves 36b, 36b are formed (see FIGS. 7 and 9).

An arrangement concave part 37a is formed in a central part of the second member 37 (see FIG. 7). A bearing section 37b is provided in the arrangement concave part 37a functioning as a thrust bearing and a radial bearing of the shaft (to be described later). Arrangement grooves 37c, 37c extending in the radial directions are formed in the second member 37. The arrangement grooves 37c, 37c are positioned across the central part of the second member 37 in such a way as to be in opposite sides being 180° apart from each other. Winding projection parts 37d, 37e are provided on a surface opposite to a surface in which the arrangement grooves 37c, 37c are formed (see FIGS. 7 and 8).

The winding projection part 37d is adapted to be thicker than the winding projection part 37e. An arrangement cutout 37f is formed in the winding projection part 37d (see FIG. 6).

The first member 36 and the second member 37 are connected to each other in a state in which the arrangement grooves 36b, 36b face the arrangement grooves 37c, 37c. Thus, the coil bobbin 35 is constituted (see FIG. 7). The arrangement grooves 36b, 36b and the arrangement grooves 37c, 37c face one another and constitute two arrangement holes 38, 38, which communicate with the outside and the inside of the coil bobbin 35.

The rotor 39 of the drive motor 14 has a shaft 40 and a magnet 41 (see FIG. 7).

The shaft 40 is disposed so that the direction of an axis thereof extends along the optical axis OL. Both end parts thereof are rotatably supported by the bearing hole 36a of the first member 36 and the bearing section 37b of the second member 37 in the coil bobbin 35.

The magnet 41 is formed like a cylinder, and two-pole-magnetized. The magnet 41 is disposed in the arrangement concave part 37a of the second member 37 and fixed in such a manner as to be fitted onto a portion of the shaft 40, which is other than both end parts in the direction of an axis thereof.

A turning arm 42 is formed integrally with the shaft 40. The turning arm 42 comprises arm portions 42*a*, 42*a* and engaging shaft parts 42*b*, 42*b* respectively provided at end parts of the arm portions 42*a*, 42*a*. The arm portions 42*a*, 42*a* are continued to the shaft 40 and protruded therefrom in a direction perpendicular to the direction of an axis thereof. The arm portions 42*a*, 42*a* are projected from the shaft 40 in the opposite directions differing by 180°. The engaging shaft parts 42*b*, 42*b* are projected in the same direction perpendicular to the arm portions 42*a*, 42*a*.

The turning arm 42 is configured so that the end parts of the arm portions 42*a*, 42*a* and the engaging shaft parts 42*b*, 42*b* are outwardly projected from the arrangement holes 38, 38 of the coil bobbin 35 (see FIG. 7).

The stator 43 of the drive motor 14 has a stator yoke 44 and a stator coil 45.

Figure 10:
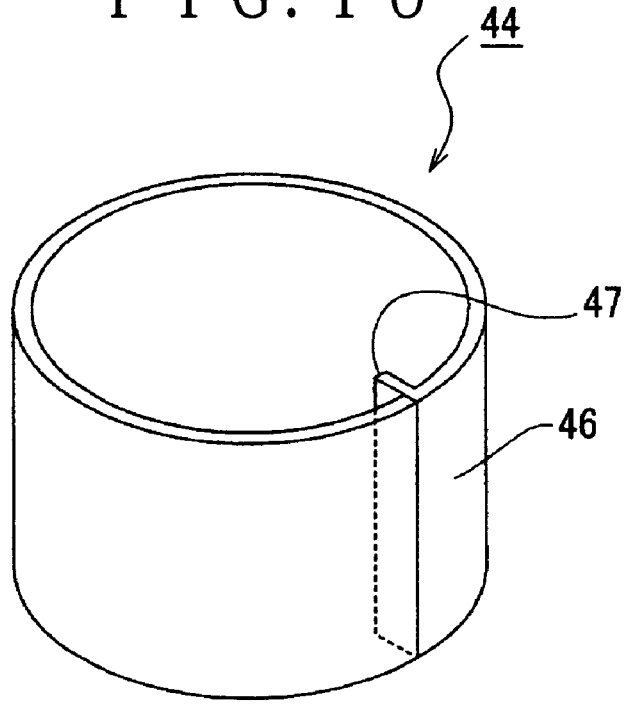
FIG. 10 is an enlarged perspective view illustrating a stator yoke.

The stator yoke 44 is constituted by forming, for example, a circumferential surface part 46, which is formed by bending a rectangular-plate-like magnetic metallic material like a cylinder and by folding inwardly an end part thereof, integrally with the projecting part 47 inwardly protruded from the circumferential surface part 46, as shown in FIG. 10. The bonding of a contact surface 46*a* of the circumferential surface part 46 is performed by appropriate means, such as adhesion or welding. The projecting part 47 functions as a magnetic balance section for holding a magnetically balanced condition established between the magnet 41 and the stator yoke 44 during the stator coil 45 is nonenergized.

Incidentally, the stator yoke 44 is positioned in such a way as to be biased toward an end of the magnet 41 in the direction of its axis. The magnet 41 is attracted to the side toward which the stator yoke is biased. Therefore, the shaft 40 is pushed against the bearing section 37*b* of the second member 37 and pressed against the bottom surface part of the bearing section 37*b* functioning as a thrust bearing.

A closed magnetic path, which is closed in the circumferential direction by the circumferential surface part 46 of the stator yoke 44, is formed in the drive motor 14.

The stator yoke 44 is attached to the coil bobbin 35 in such a way as to be fitted thereon. In a state in which the stator yoke 44 is attached to the coil bobbin 35, the projecting part 47 is placed in the space between the winding projection part 37*e* of the second member 37 of the coil bobbin 35 and the circumferential surface part 46 (see FIG. 6).

Figure 6:
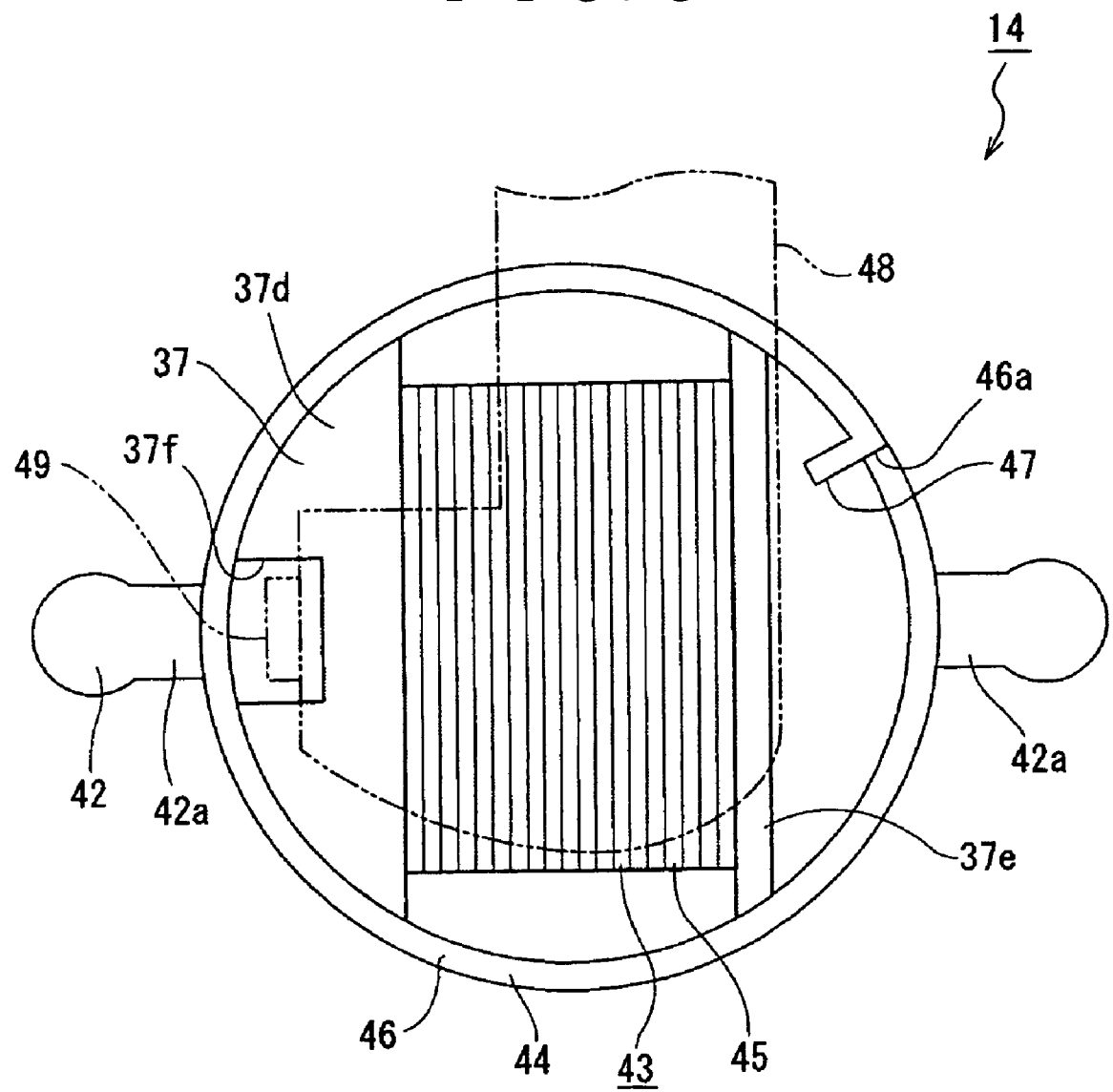
FIG. 6 is an enlarged rear view illustrating the drive motor.
Figure 9:
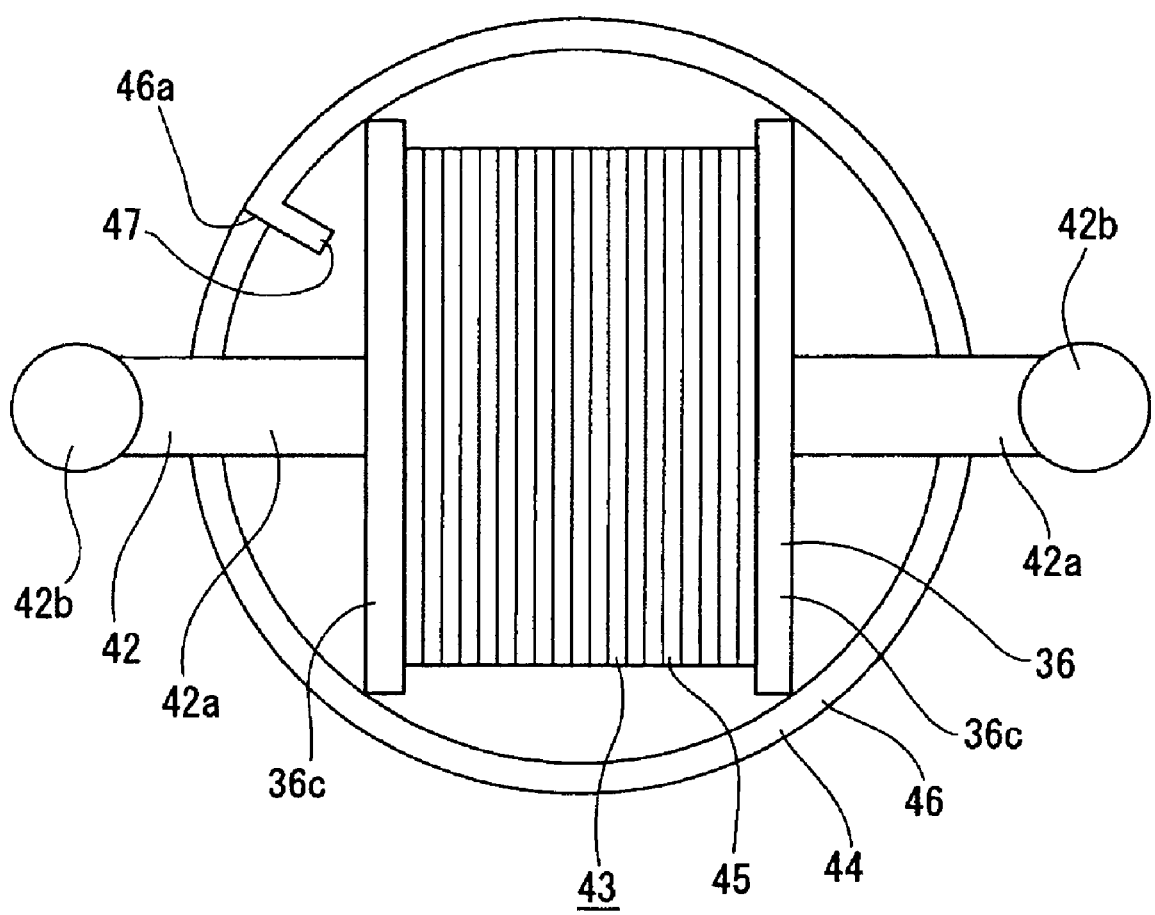
FIG. 9 is an enlarged front view illustrating the drive motor.

The stator coil 45 is wounded between the winding ridges 36*c*, 36*c* and between the winding projection parts 37*d* and 37*e* at the outer surface side of the coil bobbin 35 (see FIGS. 6 and 9). The stator coil 45 is wound in a direction perpendicular to the direction of rotation of the magnet 41.

A wiring board 48 is attached to the coil bobbin 35 (see FIG. 6). The wiring board 48 is, for instance, a flexible printed wiring board. An end part thereof is folded. Both end parts of the stator coil 45 are connected to terminal electrodes (not shown) of the wiring board 48. The stator coil 45 is energized by a power supply circuit (not shown) through the wiring board 48. A hall element 49 functioning as position detection means for detecting the rotational direction and the rotational position of the magnet 41 is provided at an end part of the wiring board 48. The end part, at which the hall element 49 is provided, of the wiring board 48 is inserted into an arrangement cutout 37*f* formed in the winding projection part 37*d* of the coil bobbin 35. The hall element 49 is disposed at a position facing the outer circumferential surface of the magnet 41.

The drive motor 14 is mounted in the motor mounting member 34 (see FIGS. 4 and 5). In a state in which the drive motor 14 is mounted in the motor mounting member 34, the engaging shaft parts 42*b*, 42*b* of the turning arm 42 are inserted into the insertion holes 34*a*, 34*a*, and slidably engaged in the engaging elongated holes 28*b*, 31*b* of the movable members 26 and 27.

The engaging shaft parts 42*b*, 42*b* of the turning arm 42 are engaged with the engaging elongated holes 28*b*, 31*b* of the movable members 26, 27. Consequently, when the turning arm 42 is turned as the rotor 39 rotates, the movable members 26, 27 are guided by the guide pins 32*b*, 32*b*, . . . and thus translation-moved in a direction in which the movable members 26, 27 are closer to or away from each other.

Figure 11:
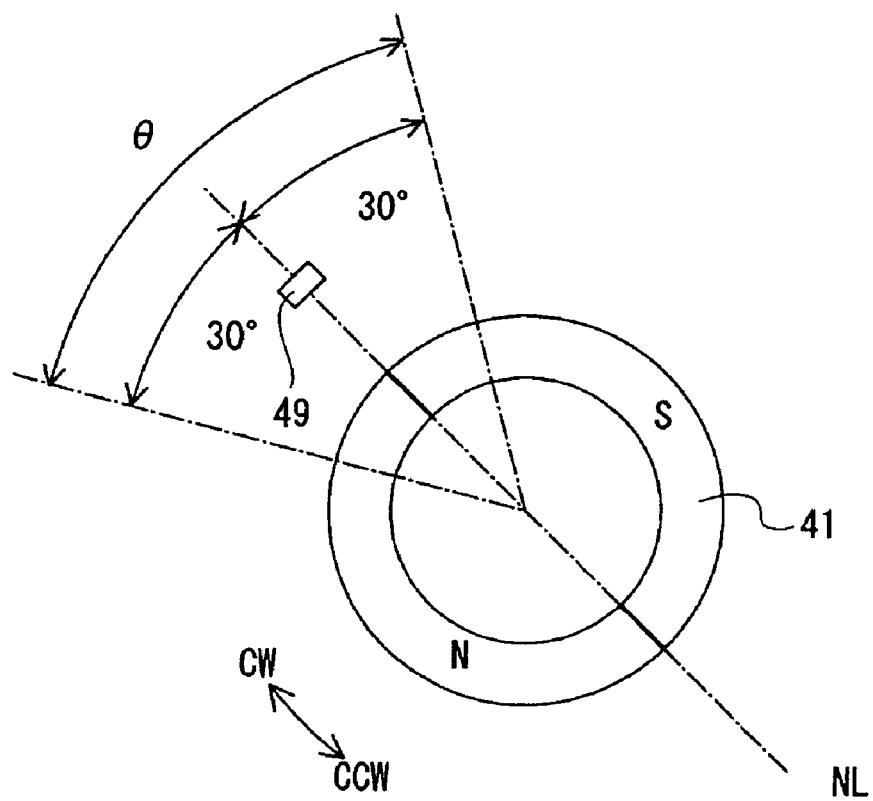
FIG. 11 is a conceptual view illustrating a rotatable angle of the magnet.

A rotatable angle θ of the rotor 39 is set to be, for example, 60° (see FIG. 11). Opening edges of the arrangement holes 38, 38 of the coil bobbin 35 function as stoppers for restraining rotation of the rotor 39. Therefore, in the cases that the angle of rotation of the rotor 39 is 0° and 60°, the arm portions 42*a*, 42*a* of the turning arm 42 are in contact with the opening edges 38, 38 of the arrangement holes 38, 38 to thereby restrain the rotation of the rotor.

The hall element 49 is disposed at an angular position (or a central position) corresponding to half the rotatable angle of the rotor 39, for example, at the angular position corresponding to 30° (see FIG. 11). The rotatable angle θ is within a range through which a neutral line NL between magnetic poles is passed by the rotation of the magnet 41. The hall element 49 outputs a detection signal corresponding to the direction of rotation of the magnet 41 and the rotational position thereof, which are detected by employing the central position as a reference.

Figure 12:
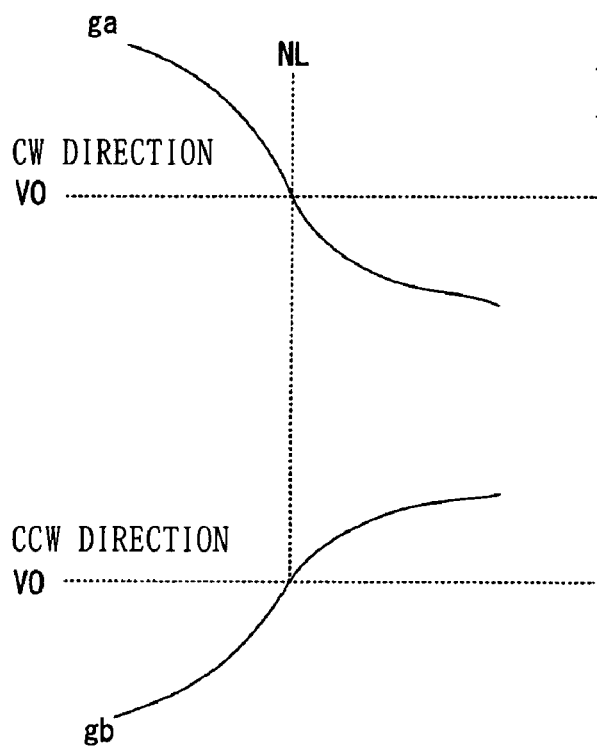
FIG. 12 is a waveform chart illustrating a detection state of a hall element.

FIG. 12 schematically illustrates detection levels detected by the hall element 49. Horizontal lines "V0" indicate the detection levels (or reference levels) at the central position.

In a case where the direction of rotation of the rotor 39 is, for example, a first direction "CW" shown in FIG. 11, the detection level by the hall element 49 gradually decreases, as indicated by a curve "ga". After the curve intersects with the level V0, the detection level further decreases. On the other hand, in a case where the direction of rotation of the rotor 39 is a second direction "CCW" shown in FIG. 11, the detection level by the hall element 49 gradually increases from a condition in which the detection level is less than the level V0, as indicated by a curve "gb". After this curve intersects with the level V0, the detection level further increases. Thus, according to change in the polarity, which is caused at the level V0, the direction of rotation of the magnet 41 of the rotor 39 is detected. Further, the rotational position of the magnet 41 can be detected according to the value of the detection level, which is determined by employing the level V0 as the reference. Incidentally, the detection signal of the hall element 49 is sent to the control section 25 and then processed therein. The rotation of the rotor 39 is controlled in response to a signal outputted to the drive motor 14 according to this detection information.

Incidentally, the drive motor 14 uses the hall element 49 as the detection means for detecting the direction of rotation of the rotor 39 and the rotational position thereof. Thus, the direction of rotation of the rotor 39 and the rotational position thereof can easily be detected with high accuracy.

As above-mentioned, the rotor 39 is rotated at an angle of rotation thereof, which is within a range between, for instance, 0° and 60°. One (an angle of rotation is 0°) of end points of the range of the angle of rotation thereof is set to be a first rotational position (see FIG. 13), at which the movable members 26 and 27 close the optical path of the imaging optical system. The other end point (an angle of rotation is 60°) of the range of the angle of rotation thereof is set to be a second rotational position (see FIG. 14), at which the movable members 26 and 27 open the optical path of the imaging optical system.

Figure 13:
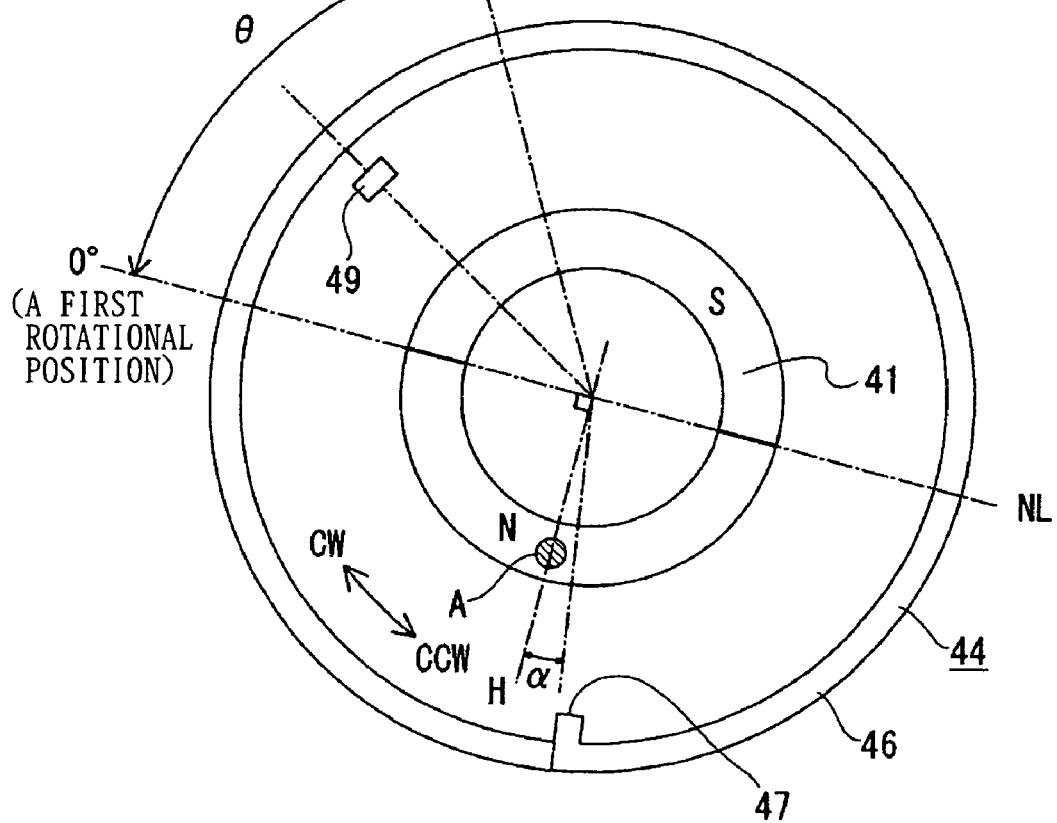
FIG. 13 is a conceptual view illustrating a state in which the magnet is in a first rotational position.
Figure 14:
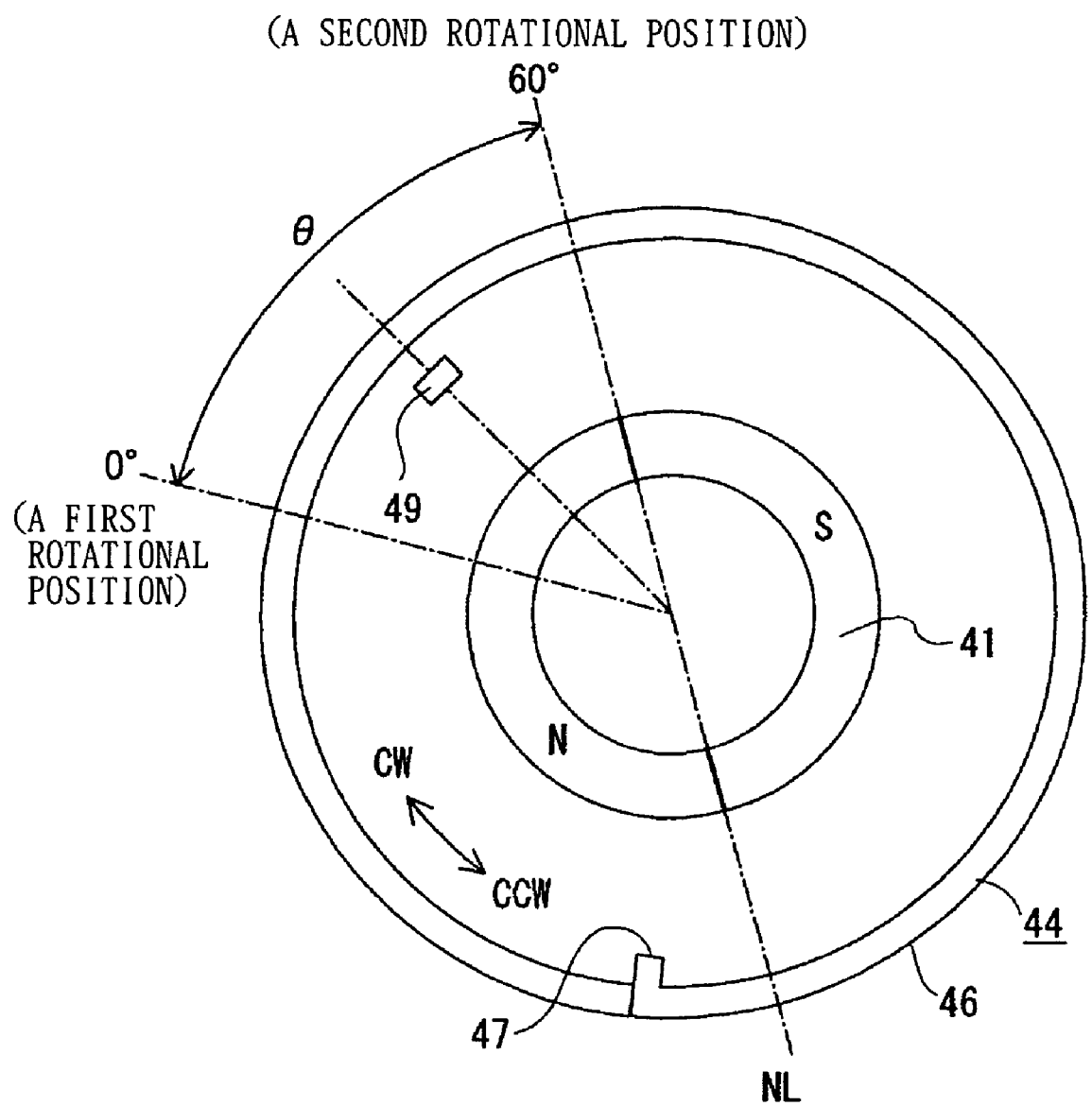
FIG. 14 is a conceptual view illustrating a state in which the magnet is in a second rotational position.

The drive motor 14 is set so that the projecting part 47 of the stator yoke 44 is positioned at a place in the vicinity of a line segment H perpendicular to the neutral line NL, as illustrated in FIG. 13. That is, in a state in which the magnet 41 is placed at the first rotational position, the projecting part 47 is placed at a position being apart by an angle α counterclockwise from a position being 90° apart in a counterclockwise (CCW) direction from the first rotational position. In a state, in which the magnet 41 is placed at the second rotational position, as illustrated in FIG. 14 this position of the projecting part 47 is a position being apart in a clockwise (CW) direction from the neutral line NL positioned in the vicinity thereof.

Pushing force acting in a direction, in which a part A (see FIG. 13) central in the circumferential direction of one of the magnetic poles of the magnet 41, for instance, N-pole is attracted to the projecting part 47, that is, in which the magnetically balanced condition between the magnet 41 and the stator yoke 44 is maintained during the stator coil 45 is nonenergized, is applied to the rotor 39 by setting the position of the projecting part 47 at the above-mentioned position. Thus, during the stator coil 45 is nonenergized, counterclockwise (CCW) torque is applied to the shaft 40, the magnet 41, and the turning arm 42. Incidentally, as above-mentioned, the rotor 39 can only be rotated to a maximum rotational position, at which the arm portions 42a, 42a of the turning arm 42 are in contact with the opening edges of the arrangement holes 38, 38 of the stator yoke 44. Thus, in a state in which the central part A is attracted to the projecting part 47, the magnet 41 is held at the first rotational position.

Figure 15:
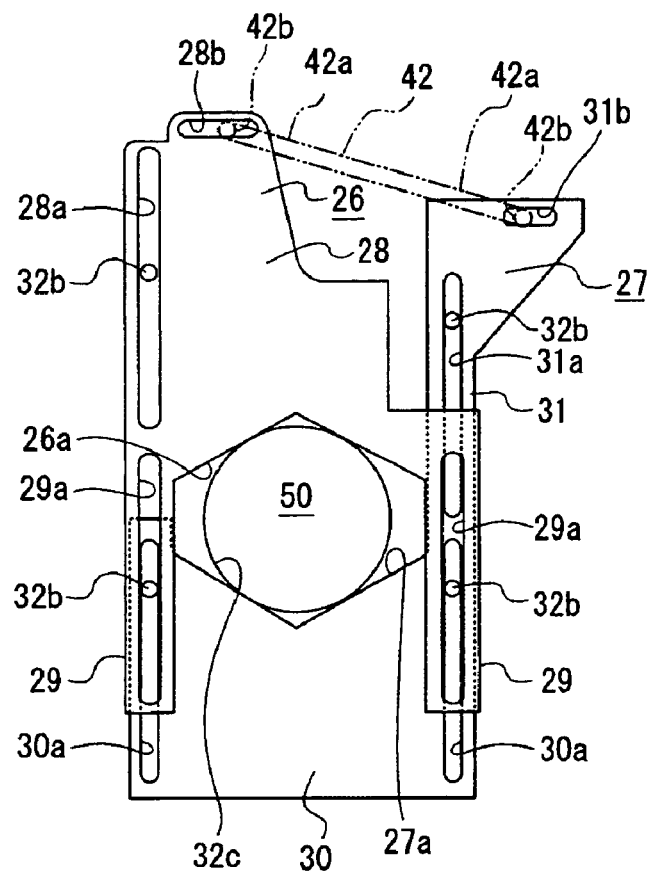
FIG. 15 illustrates, together with FIG. 16, an operation of the movable member and is an enlarged rear view illustrating a state in which a penetration hole is opened.
Figure 16:
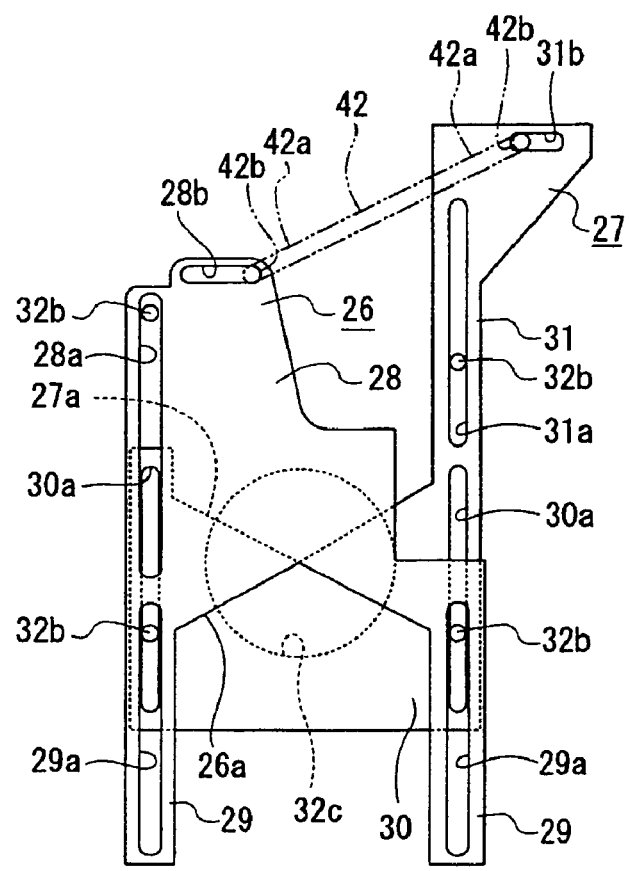
FIG. 16 is an enlarged rear view illustrating a state in which the penetration hole is blocked up.

Next, operations of the movable members 26, 27, which are performed as the rotor 39 rotates, are described hereinbelow (see FIGS. 15 and 16).

As the rotor 39 is rotated by energizing the stator coil 45, the turning arm 42 is turned in the clockwise direction as indicated in FIG. 11. Then, as illustrated in FIG. 15, the movable members 26, 27 are moved in a direction away from each other. The area of an opening 50 constituted by the aperture cutouts 26a, 27a of the movable members 26,27 increases. Thus, the penetration hole 32c is gradually opened, so that an amount of incident light increases. Conversely, as the turning arm 42 is turned in a counterclockwise (CCW) direction indicated in FIG. 11, the movable members 26, 27 are moved in a direction in which the members come closer to each other. The area of the opening 50 constituted by the aperture cutouts 26a, 27a of the movable members 26, 27 decreases. Thus, the penetration hole 32c is gradually closed, so that the amount of incident light decreases.

Thus, the amount of light transmitted by the penetration hole 32c of the base element 32 is adjusted according to the size of the opening 50 defined by the movable members 26, 27.

When the energization of the stator coil 45 is stopped in a state in which the rotor 39 is rotated in the CW direction, the rotor 39 is then turned in the CCW direction so that the magnet 41 is brought into a magnetically balanced condition. Thus, the magnet 41 is returned to the first rotational position to thereby close the optical path of the optical system. Therefore, for example, even when supply of electric power to the drive motor 14 is interrupted, the optical path of the optical system is surely closed, so that the solid-state imaging device 16 can be protected.

Incidentally, to return the magnet to the first rotational position at high speed, the stator coil 45 may only be energized so that the rotor 39 is rotated in the CCW direction.

As above-mentioned, in the drive motor 14, the projecting part 47 functioning as the magnetic balance holding section, which holds the magnetically balanced condition between the magnet 41 and the stator yoke 44 during non-energization of the stator coil 45, is formed integrally with the circumferential surface part 46 of the stator yoke 44. Thus, as compared with the case of providing in the motor a separate member exclusively used as the magnetic balance holding section, the number of components thereof can be reduced. Furthermore, because of the small arrangement space of the magnetic balance holding section, the miniaturization thereof can be achieved.

Further, because the closed magnetic path, which is closed in the direction of rotation of the magnet 41, is constituted by the circumferential surface part 46 of the stator yoke 44, leakage of magnetic flux is little. The torque of the drive motor 14 is enhanced to thereby improve the reliability of operations thereof.

Moreover, the consumption of electric power can be reduced by enhancing the torque of the drive motor 14.

Furthermore, because the projecting part 47 protruded from the circumferential surface part 46 of the stator yoke 44 is used as the magnetic balance holding section, the configuration thereof is simple. The configuration of the drive motor 14 can be simplified. Also, the torque of the drive motor 14 can be enhanced without a steep rise in the cost thereof.

Additionally, because the projecting part 47 is protruded toward the coil bobbin 35 from the inner surface of the circumferential surface part 46, the miniaturization of the drive motor can be enhanced for that.

Hereinafter, examples of modification of the stator yoke are described (see FIGS. 17 to 22).

In a stator yoke 44A according to a first example of the modification, as illustrated in FIG. 17, a part of the portion formed like a cylinder is inwardly dented by using a magnetic metal material. Thus, the circumferential surface part 46A is formed integrally with a projecting part 47A inwardly protruded.

The stator yoke 44A can easily be formed in a short time, because there is no necessity for bending a plate-like material and connecting both ends thereof by adhesive bonding or the like so as to form the circumferential surface part.

In a stator yoke 44B according to a second example of the modification, as illustrated in FIG. 18, a hole 47B functioning as the magnetic balance holding section is formed in the circumferential surface part 46B. Incidentally, a plurality of the holes 47B may be formed in such a way as to extend in the direction of an axis of the circumferential surface part 46B. Further, alternatively, a cutout or a slit may be formed instead of the hole 47B.

Because the hole 47B is formed as the magnetic balance holding section in the stator yoke 44B, during non-energization of the stator coil 45, the neutral line NL of the magnet 41 is turned in such a manner as to be attracted toward the hole 47B. Thus, there is need for setting the first rotational position and the second rotational position of the magnet 41 in view of that fact.

The stator yoke 44B does not need to be provided with a projecting part serving as the magnetic balance holding section. Consequently, the stator yoke 44B can easily be formed. Also, the miniaturization of the drive motor 14 and the effective utilization of the inner space of the circumferential surface part 46B can be achieved.

In a stator yoke 44C according to a third example of the modification, as illustrated in FIG. 19, a planar part 47C functioning as the magnetic balance section is formed integrally with an arcuate surface part 51 positioned between both ends of the planar part 47C.

In the stator yoke 44C, during non-energization of the stator coil 45, the magnet 41 is turned so that the central part A (see FIG. 13) of the magnetic pole is attracted toward the planar part 47C functioning as the magnetic balance section.

The stator yoke 44C can easily be formed in a short time, because there is no necessity for bending a plate-like material and connecting both ends thereof by adhesive bonding or the like so as to form the planar part 47C and the arcuate surface part 51.

Further, because the planar part 47C is formed, as compared with the case of forming the entire yoke like a cylinder, the miniaturization of the drive motor 14 can be achieved.

Figure 20:
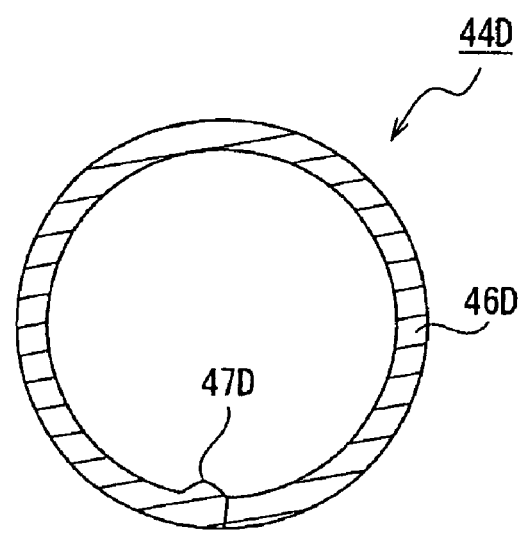
FIG. 20 is an enlarged cross-sectional view illustrating a fourth example of modification of the stator yoke.

As illustrated in FIG. 20, a stator yoke 44D according to a fourth example of the modification comprises a circumferential surface part 46D and a projecting part 47D, which is formed like a triangle.

Figure 21:
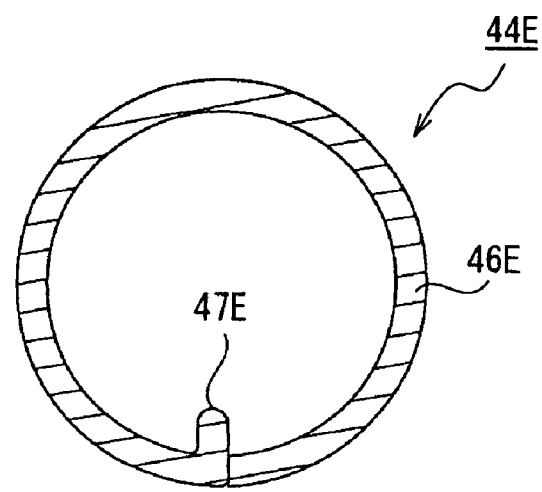
FIG. 21 is an enlarged cross-sectional view illustrating a fifth example of modification of the stator yoke.

As illustrated in FIG. 21, a stator yoke 44E according to a fifth example of the modification comprises a circumferential surface part 46E and a projecting part 47E, the end part of which is formed like a half-circle.

Figure 22:
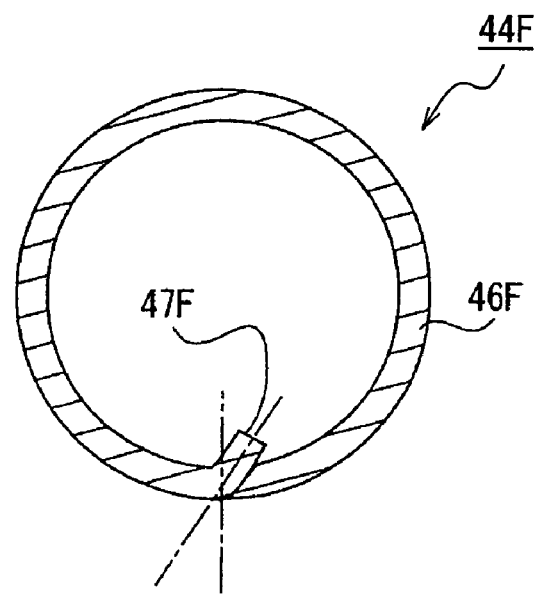
FIG. 22 is an enlarged cross-sectional view illustrating a sixth example of modification of the stator yoke.

As illustrated in FIG. 22, a stator yoke 44F according to a sixth example of the modification comprises a circumferential surface part 46F and a projecting part 47F, which is protruded in a direction inclined to a direction in which the central point of rotation of the magnet 41 is positioned.

Although the foregoing description has described the examples each having only one part, that is, an associated one of the projecting part 47, the projecting part 47A, the hole 47B, the planar part 47C, the projecting part 47D, the projecting part 47E, and the projecting part 47F, which serves as the magnetic balance holding section, two of these parts functioning as the magnetic balance holding sections may be provided across the central point of rotation of the magnet 41 at the opposite positions being 180° apart from each other.

The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. An imaging apparatus having a lens barrel, in which an imaging optical system is disposed, a movement mechanism having movable members, which constitutes an iris or a shutter and opens and closes an optical path of said imaging optical system, and a drive motor serving as a drive source for said movement mechanism, wherein said drive motor comprises:

a shaft serving as a center of rotation;
a magnet, two-pole magnetized and rotated around said shaft;
a turning arm engaged with said movable members and turned integrally with said magnet, for moving said movable members in a direction associated with a turning direction;
a stator coil wound in a direction perpendicular to a direction of rotation of said magnet and disposed in such a way to enclose said magnet from outside;
a coil bobbin on which said stator coil is wound;
a stator yoke disposed outside said coil bobbin and having a cylindrical circumferential surface part penetrated in an axial direction of said shaft; and
position detection means for detecting a rotational position of said magnet;
wherein a closed magnetic path, which is closed in a direction of rotation of said magnet, is constituted by said circumferential surface part of said stator yoke, and a magnetic balance holding section, which holds a magnetically balanced condition between said magnet and said stator yoke during non-energization of said stator coil, is formed integrally with said stator yoke, and
wherein a projecting part protruded from said circumferential surface part of said stator yoke is provided therewith as a magnetic balance holding section of said stator yoke.

2. The imaging apparatus according to claim 1, wherein said projecting part is protruded toward said coil bobbin from the inner surface of said circumferential surface part.

3. The imaging apparatus according to claim 1, wherein said projecting part is protruded toward a side opposite to said coil bobbin from an outer surface of said circumferential surface part.

4. The imaging apparatus according to claim 1, wherein a hole or a cutout is formed in said circumferential surface part as said magnetic balance holding section of said stator yoke.

5. The imaging apparatus according to claim 1, wherein said circumferential surface part of said stator yoke comprises an arcuate surface part and a planar part positioned between both ends in the circumferential direction of said arcuate surface part, and said planar part is configured as said magnetic balance holding section.

6. A drive motor serving as a drive source for a movement mechanism having movable members, which constitutes an iris or a shutter and opens and closes an optical path of an imaging optical system disposed in a lens barrel, wherein said drive motor comprises:

a shaft serving as a center of rotation;
a magnet, two-pole magnetized and rotated around said shaft;
a turning arm engaged with said movable members and turned integrally with said magnet, for moving said movable members in a direction associated with a turning direction;
a stator coil wound in a direction perpendicular to a direction of rotation of said magnet and disposed in such a way to enclose said magnet from outside;
a coil bobbin on which said stator coil is wound,
a stator yoke disposed outside said coil bobbin and having a cylindrical circumferential surface part penetrated in an axial direction of said shaft; and
position detection means for detecting a rotational position of said magnet;
wherein a closed magnetic path, which is closed in a direction of rotation of said magnet, is constituted by said circumferential surface part of said stator yoke, and a magnetic balance holding section, which holds a magnetically balanced condition between said magnet and said stator yoke during non-energization of said stator coil, is formed integrally with said stator yoke, wherein a projecting part protruded from said circumferential surface part of said stator yoke is provided therewith as a magnetic balance holding section of said stator yoke.

7. The drive motor according to claim 6, wherein said projecting part is protruded toward said coil bobbin from the inner surface of said circumferential surface part.

8. The drive motor according to claim 6, wherein said projecting part is protruded toward a side opposite to said coil bobbin from an outer surface of said circumferential surface part.

9. The drive motor according to claim 6, wherein a hole or a cutout is formed in said circumferential surface part as said magnetic balance holding section of said stator yoke.

10. The drive motor according to claim 6, wherein said circumferential surface part of said stator yoke comprises an arcuate surface part and a planar part positioned between both ends in the circumferential direction of said arcuate surface part, and said planar part is configured as said magnetic balance holding section.

* * * * *